W. M. RAPP.
CATCH BASIN.
APPLICATION FILED JAN. 8, 1915.
1,143,915.
Patented June 22, 1915.
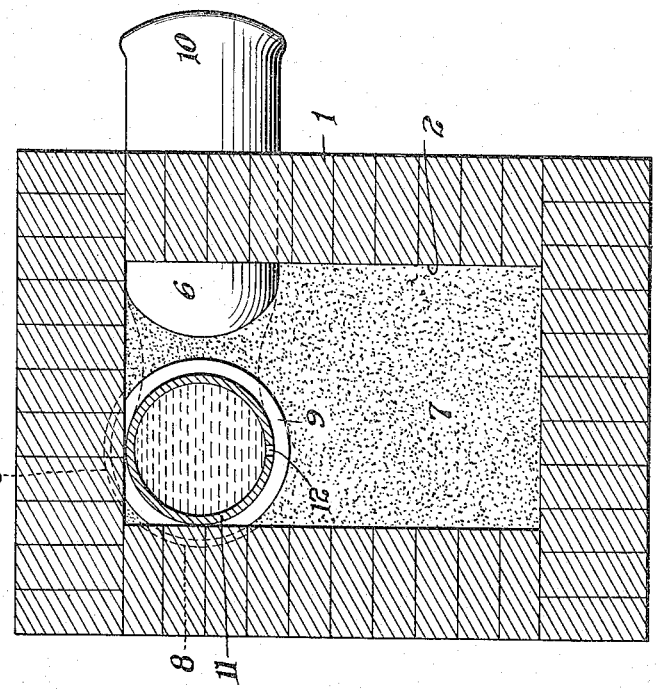
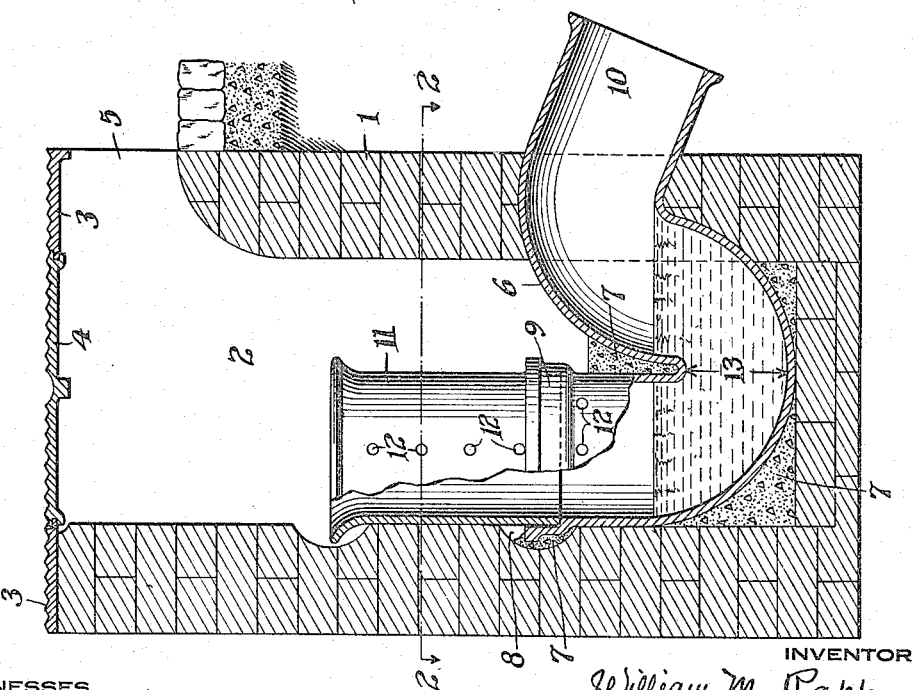
WITNESSES
Daniel Webster, Jr.
C. H. Wissmann
INVENTOR
William M. Rapp
BY
ATTORNEY

UNITED STATES PATENT OFFICE.

WILLIAM M. RAPP, OF ATLANTA, GEORGIA.

CATCH-BASIN.

1,143,915. Specification of Letters Patent. Patented June 22, 1915.

Application filed January 8, 1915. Serial No. 1,082.

*To all whom it may concern:*

Be it known that I, WILLIAM M. RAPP, a citizen of the United States, and resident of Atlanta, county of Fulton, and State of Georgia, have invented an Improvement in Catch-Basins, of which the following is a specification.

This invention relates to catch basins for city water systems and consists of certain improvements which are set forth in the following specification and shown in the accompanying drawings which form a part thereof.

The object of the invention is to provide a catch basin which will serve effectively as a means to collect and discharge water from the street gutters or the like and at the same time provide a liquid seal to prevent sewer gases escaping by way of the said basin.

It has for a further object to provide a catch basin having a discharge siphon so constructed and arranged as to automatically act to increase the rush of water to remove collected sediment, sand or the like in the seal or trap whereby the said trap for the catch basin may not become clogged and thereby become inoperative. It has for a further object to provide a catch basin wherein stones, sticks or other debris are separated from the water and cannot under ordinary conditions enter the discharge of the siphon trap or find their way into the sewer, while at the same time permitting free capacity for the discharge of the water.

My invention consists in a suitably constructed catch basin built of brick or cement with an inlet at the upper part to receive the water and drainage from the street, and fitted at the bottom with a siphon or trap made as a separate element in complete form and built into the bottom of the basin so that its inlet side extends up into the basin while the outlet end opens outside of the basin and preferably in a downward direction for communication with the sewer. The siphon constitutes a seal or trap and preferably has its passage so shaped as to constitute a restricted passage to increase the force of the discharge of water through the trap or seal portion; further, in the construction above stated, when the siphon is provided with an upright tubular inlet portion extending well above the floor of the basin to provide a stand pipe, through which the water when in excess may pass and be directed to increase the force of the flow through the siphon, the said standpipe and siphon above the floor being provided with small drainage passages whereby the liquid within the basin may find egress into the siphon while holding back large objects which should not pass into the sewer.

My improvements also comprehend details of construction which, together with the features above specified, will be better understood by reference to the drawings, in which:—

Figure 1 represents a sectional elevation of a catch basin construction embodying my invention; and Fig. 2 represents a section on line 2—2 of Fig. 1.

1 designates the inclosing walls forming the catch basin chamber or vault 2 and being preferably of brick construction, though it will be understood that any desired type of masonry or concrete may be employed. The catch basin 2 is roofed in or closed by a suitable cover plate 3 preferably provided with a manhole cover 4 or like device.

5 designates the inlet opening to the catch basin, the same being located at the street or gutter level so that water is free to drain or flow into the catch basin.

6 designates a siphon member, preferably of molded material such as cast metal or terra cotta, positioned at the bottom of the basin 2 and set in concrete 7 with the receiving end substantially vertical and preferably contacting with the walls of the vault to more effectively maintain it in its fixed position. In this connection it will be noted that the wall 1 is slightly recessed at places as shown at 8 to receive the bell flange 9 at the inlet end of the siphon, and this part also may be secured in position by concrete, as will be understood. The discharge end 10 of the siphon extends through the wall of the basin and is adapted to be connected to a trunk sewer or pipe connecting therewith.

11 designates a stand pipe section adapted to seat within the flange 9 and form a continuation of the inlet end of the siphon, extending to a suitable height in the basin 2 to form an inlet for the overflow of collected water when in great volume. In the present instance I have provided a plurality of small openings 12 respectively located at different levels in the stand pipe 11 while the inlet end of the siphon is likewise preferably provided with such openings and desirably communicating with the basin at a point adjacent its bottom or floor.

In connection with the siphon member attention is directed to a feature of construction which consists of contracting the section of the siphon at the points 13 of the return bend or trap, thus giving the effect of a restricted tube so that the flow during the full discharge of the siphon is increased in velocity and pressure. This construction avoids the collection of silt, sand, gravel or the like within the return bend or trap, and consequently there is no permanent clogging of the siphon as happens where the siphoning action takes place under a normal flow in the usual type of catch basins.

In the operation of the device, water drains directly from the street into the catch basin (which is preferably located below the sidewalk and has its inlet opening at the side of the curb), collecting in the bottom of the catch basin where it drains freely through the openings 12 and finds its way to the sewer, and at the same time maintaining the water seal in the siphon or trap. In case an excess of water enters the catch basin so as to raise the water level above the mouth of the stand pipe 11, it will of course overflow and admit a large volume of water into the siphon tube forming an artificial head which becomes effective in discharging the siphon. The result of this is to cause a full siphoning action attended by increased pressure and velocity at the contracted portion 13, whereupon mud or collected sediment is forced out with the water so that the interior of the siphon is not only freed of material which in quantity would clog the tube, but the siphon is also subjected to a scouring action. The openings 12 form a means of draining the water from the catch basin under ordinary working conditions, thereby preventing sand, rock, sticks or other solid material from entering the siphon tube or sewer, these remaining in the catch basin and from which they may be readily removed through the closure opening, as will be understood, such cleaning out being made at convenient intervals and without interfering with the water seal, siphon or regular operation of the catch basin. Furthermore the contracted or restricted section of the siphon provides a minimum quantity of water as a seal to prevent the sewer gases passing through the siphon and hence in times of draft the seal may be maintained with a less demand for water. The device at all times operates as an effective water seal.

Attention is particularly directed to the function of the siphon tube extension or standpipe section 11, in that it directs a large volume of water into the siphon tube in a straight course undisturbed by lateral flow and gives a full and complete flushing effect. The pressure and velocity of the inrushing volume of water is appreciably increased by the contracted or restricted section of the tube so that collected mud or sediment is positively disturbed and forced out with the discharging water. It will further be seen that I prefer to place the siphon in the basin so that it is close to one side and the inlet and stand pipe 11 are arranged in the corner and thereby receive the support of two walls; and this arrangement moreover provides large space in which the water and debris may flow and the latter collect, and also provide a space in which a man may enter for repairs or other purpose. By making the siphon independently and setting it in the basin in a cement bottom the construction of the basin as a whole may be cheaply and durably made; and by having the stand pipe 11 separate from the siphon proper, various heights of such sections may be employed to suit the requirements.

It will be understood, while I have referred to the siphon tube and its adjuncts as of cast metal, that this is only by way of example and the same may be of terra cotta, vitrified material or the like without departing from the scope of my invention, and accordingly I do not wish to be understood as limiting myself in any manner to any specific material.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to protect by Letters Patent is:

1. In a device of the character stated, the combination of a catch basin chamber, with a siphon tube mounted therein to discharge the water from said basin, said tube having an extension or stand pipe having its inlet end above the floor or bottom of the chamber and provided with a plurality of small openings to form a communication between the interior of said tube and said catch basin chamber whereby debris may be separated from the water and collected in said basin.

2. In a device of the character stated, the combination of a catch basin chamber, with a siphon tube mounted therein and extending below the bottom of the chamber and having a restricted passage at its lowest portion to form a water seal below the level of said chamber bottom, said siphon tube having a stand pipe section on its inlet side extending upward to a distance above said bottom and having a large inlet opening at its upper end.

3. In a device of the character stated, the combination of a catch basin chamber, with a siphon tube mounted therein to provide a water seal below the bottom of the chamber, said seal having a restricted section sufficiently below the said bottom whereby the velocity of the discharging water from the chamber is increased for the purpose of removing collected material in said tube.

4. In a device of the character stated, the combination of a catch basin chamber, with a siphon tube mounted therein to extend below the surface of the bottom and having a restricted section, and a stand pipe connected to the inlet of said tube and extending a sufficient distance above the bottom of said catch basin chamber to form an artificial head, said pipe having a small opening therethrough located adjacent the surface level of the bottom of the chamber.

5. In a device of the character stated, the combination of a catch basin chamber, with a siphon tube mounted therein, said tube having its inlet end arranged in abutting relation with the side walls of the catch basin, means to maintain said tube in fixed operative position and form the floor of the chamber, a stand pipe extension secured to the inlet end of said siphon tube, said siphon having an opening therein adjacent to the floor of the chamber.

6. In a device of the character stated, the combination of a catch basin chamber, with a siphon tube mounted therein having a restricted passage, said tube having its inlet end arranged in a corner formed by angularly arranged walls of the catch basin and having an upwardly extending inlet portion having an inlet opening above the floor of the chamber and provided with a plurality of openings therein respectively arranged at different levels, the lower of which are substantially on a level with the bottom of said chamber, and means to maintain said siphon tube in fixed operative position and form the floor of the chamber.

7. In a device of the character stated, the combination of a catch basin chamber having an opening through its side walls, with a separately constructed siphon tube mounted within the chamber adjacent to its lower part and having its discharge portion extending through the opening in the walls of the chamber and also having its inlet end opening into the chamber, and means to hold the siphon in position and seal the lower portion of the chamber consisting of concrete filling the lower part of the chamber and surrounding the siphon tube to form the bottom of the chamber and hold the siphon rigidly in position.

8. In a device of the character stated, the combination of a catch basin chamber having an opening through its side walls, with a separately constructed siphon tube mounted within the chamber adjacent to its lower part and having its discharge portion extending through the opening in the walls of the chamber and also having its inlet end opening into the chamber, and means to hold the siphon in position and seal the lower portion of the chamber consisting of concrete filling the lower part of the chamber and surrounding the siphon tube to form the bottom of the chamber and hold the siphon rigidly in position, said siphon tube having a large inlet opening above the floor level and a small drainage opening providing a communication from the chamber adjacent to the floor in the siphon tube.

9. In a device of the character stated, the combination of a catch basin chamber having an opening through its side walls, with a separately constructed siphon tube mounted within the chamber adjacent to its lower part and having its discharge portion extending through the opening in the walls of the chamber and also having its inlet end opening into the chamber, means to hold the siphon in position and seal the lower portion of the chamber consisting of concrete filling the lower part of the chamber and surrounding the siphon tube to form the bottom of the chamber and hold the siphon rigidly in position, and a detachable upwardly extending inlet tube section for the inlet portion of the siphon whereby a stand pipe effect may be produced to increase the flushing of the siphon, and said siphon and stand pipe constructed to provide means for drainage of the chamber adjacent to the floor in the siphon.

In testimony of which invention, I hereunto set my hand.

W. M. RAPP.

Witnesses:
R. B. SIMMS,
A. M. INGRAM.

Copies of this patent may be obtained for five cents each, by addressing the "Commissioner of Patents, Washington, D. C."